Nov. 4, 1958 — L. J. COLLINS — 2,858,847
VALVES
Filed July 2, 1956
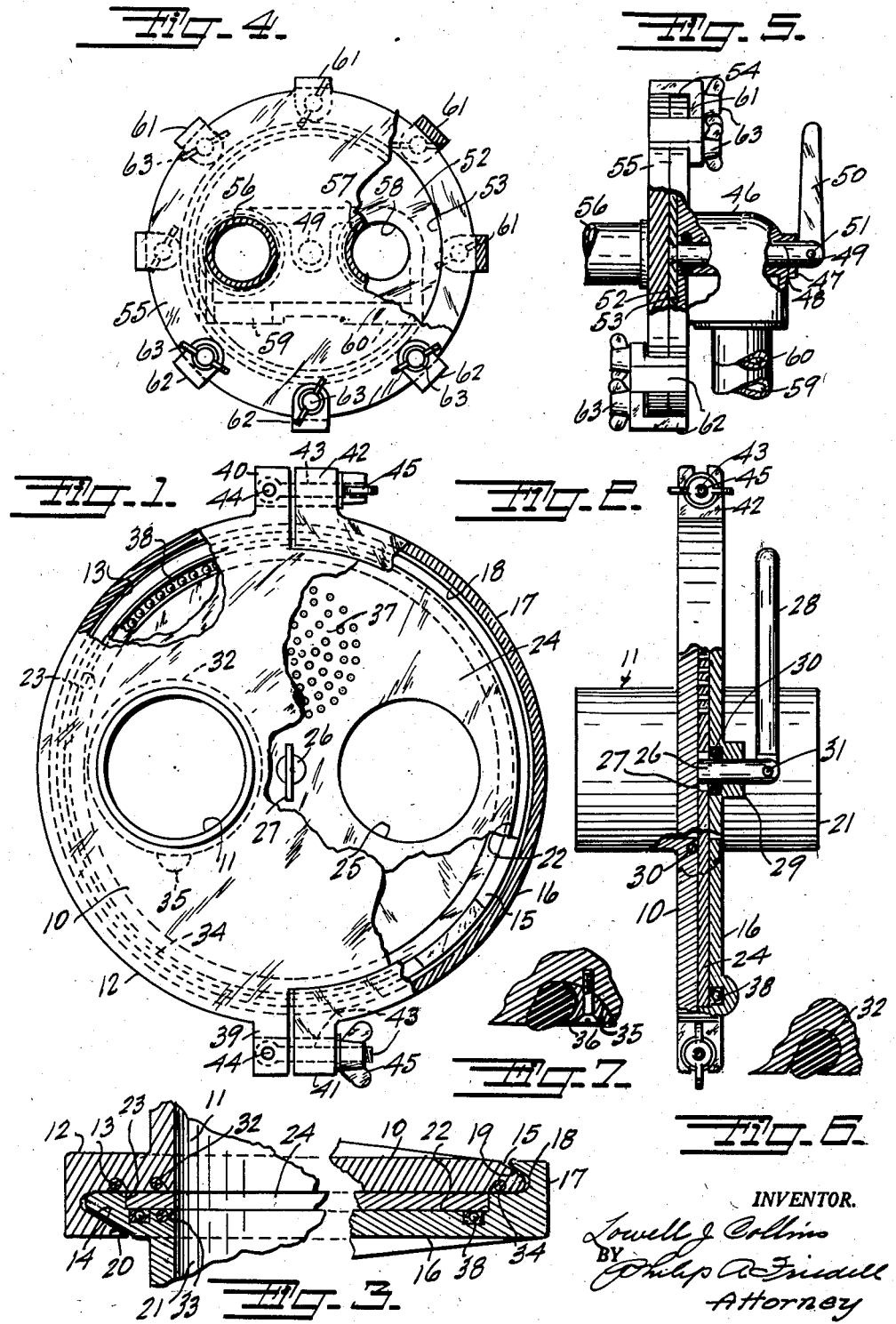
INVENTOR.
Lowell J. Collins
BY Philip A. Friedell
Attorney

United States Patent Office 2,858,847
Patented Nov. 4, 1958

2,858,847

VALVES

Lowell J. Collins, Oakland, Calif.

Application July 2, 1956, Serial No. 595,261

7 Claims. (Cl. 137—597)

This invention relates to improvements in valves, and particularly to a sanitary valve for use in the dispensing of fluid food mixes, one which consists of a minimum number of parts and which is quickly and easily assembled and disassembled for cleaning and sterilizing with a minimum of labor and loss of time, and provides an ideal dispensing valve for food mixing machines, assuring noncontamination of food products such as cottage cheese, chili, sandwich spreads, and similar products. This valve obviously can be used for many other purposes and would be most desirable where a valve must be cleaned frequently because of the ease, convenience, and rapidity of assembly and disassembly.

This application is a continuation in part of my copending application Serial Number 483,234, filed January 21, 1955, for Continuous Production Combined Food Mixing and Filling Machine, and provides a valve which in one form requires the loosening of only two wing nuts to permit complete disassembly to permit separate washing and sterilizing of each part, with the valve just as quickly and easily reassembled, thus providing the most efficient and advantageous type of valve possible to produce for food mixing machines.

The objects and advantages of the invention are as follows:

First, to provide a valve which is quickly and easily disassembled for efficient washing and sterilizing, and just as quickly and easily reassembled.

Second, to provide a valve as outlined which is formed of an absolute minimum number of parts.

Third, to provide a valve as outlined which can be arranged for dispensing from one or two sources by mere changing the head of the valve.

Fourth, to provide a valve as outlined which can be arranged for dispensing to one or more points by merely changing the base of the valve.

Fifth, to provide a valve as outlined with means for straining of a food product during the operation of dispensing thereof.

Sixth, to provide efficient sealing means for the valve to prevent leakage or contamination of the food product.

Seventh, to provide a valve as outlined which is positive and simple to control, assemble, and disassemble.

In describing the invention reference will be had to the accompanying drawings, in which:

Fig. 1 is a top plan view of the preferred form of the invention with a portion of the head and of the valve disc broken away and parts shown in section to disclose the internal features.

Fig. 2 is a side elevation of Fig. 1, partly shown in section.

Fig. 3 is an enlarged broken fragmentary view showing the assembly features in enlarged section.

Fig. 4 is a top plan view of the valve disclosed in the previously mentioned patent application, with a portion of the head broken away to show interior details.

Fig. 5 is a side elevation of Fig. 4 with a portion broken away to show the valve shaft connection.

Fig. 6 is a fragmentary enlarged section through the O-ring sealing means and groove.

Fig. 7 is a fragmentary enlarged section through the O-ring and groove and showing the access recess and filler, for removal or replacement of the O-ring.

The invention as illustrated in Figs. 1, 2 and 3 consists of a head 10 having an intake passage 11 opening through the head on one side of center and having a depending flange 12 extending throughout one-half of the circumference and which flange is provided with an internal annular groove 13 and which forms the female half of the interlocking means, the lower wall of which is formed angularly downward as indicated at 14; the other half of the circumference terminating in an upward beveled edge as indicated at 15, and forming the male half of the interlocking means.

The base 16 is formed in opposition about its periphery, one half of the circumference having an upturned flange 17 which is provided with the internal annular groove 18 the top wall 19 of which is formed angularly upward to provide the female half, while the other half of the circumference is formed with the lower wall 20 dependent toward the axis of the valve and forming the male half of the interlocking means. A single discharge or dispensing outlet 21 is in axial registry with the intake passage 11.

An axial recess 22 is formed in the top of the base with its periphery beyond the outer edge of the intake passage as indicated at 23. The valve disc 24 rotatably fits in this recess and has a single passage 25 of substantially the same size as the intake passage formed through the head.

The valve disc shaft 26 is slotted at its upper end and a key 27 is fixed in this slot and projects from both sides, the key being located off center so that the valve disc will fit in only one position, the disc having grooves formed to receive the ends of the key. Thus the disc is certain to be properly oriented in relation to the handle 28. This valve disc shaft is rotatable and slidable in the bearing 29 which depends from the underside of the base, and O-ring sealing means is provided for this shaft as indicated at 30. The handle 28 is hingedly secured to the lower end of the shaft 26 as indicated at 31, the handle having a maximum diameter slightly less than that of the shaft so that it can be withdrawn through the bearing with the shaft. Thus the disc can be removed without disturbing the shaft, or the shaft can be removed without disturbing the disc.

An O-ring 32 is set in a restricted angular groove formed in the underside of the head, and another 33 in the top side of the base within the disc recess, both surrounding the respective passages for intake and discharge, the form of groove and the compression of the O-ring being illustrated to an enlarged scale in Fig. 6. Another O-ring is set in a similar groove formed in either, the head or the base, being shown in the head, and extends in spaced relation about the valve disc as indicated at 34. Each of these grooves are provided with a finger access recess 35 to permit convenient removal of the O-ring, and the recesses are each provided with a removable plug 36, which retains the compressed condition for perfect sealing at this location by the O-ring. 34 seals the joint between head and base.

The valve disc is provided with a single through opening 25 as previously mentioned, and shown as also provided with a screening or straining portion 37. For high pressures, the disc may operate on a ball thrust bearing 38 which is shown located adjacent the periphery of the disc and seated in the base. For low pressures this ball bearing would not be necessary.

The head and base members are each provided with opposed ears as indicated at 39 and 40 for the head, and 41 and 42 for the base, these ears being located at the change points between the male and female portions. These ears are transversely slotted, for the securing means which consists for each, a screw 43 which has one end pivoted in the ear of one element as indicated at 44, the other end of the screw being provided with a thumb nut or a wing nut 45.

Thus, to disassemble this valve it is merely necessary to loosen the wing nuts 45 and swing them outwardly about their pivots and remove the head from the base by relative lateral movement, after which the valve disc, the valve shaft and handle, can be withdrawn, thus providing the simplest and quickest possible method of disassembly and reassembly.

The valve illustrated in Figs. 4 and 5 was disclosed in the previously mentioned patent application, and as is obvious, may have one or more intake passages and one or more discharge passages because of the depending housing formed on the base.

This valve operates in the same way as that shown in Figs. 1, 2 and 3, and is illustrated with two intake passages for connection to two sources of supply, and two discharge or dispensing passages, with the securing means being of a different type. This valve consists of a housing 46 having a bearing 47 depending vertically therethrough and which is provided with a bore 48 for the valve disc shaft 48 which terminates in a hand lever 50 which has a diameter slightly less than that of the shaft to which the hand lever is hinged as indicated at 51, so that it can be withdrawn through the bore along with the shaft for quick disassembly.

The upper end of this valve shaft is fixed to the valve disc 52 which in turn is set in a counterbore 53 which is formed in the top of the housing and in which the valve disc is rotatable, the housing having an annular flange 54.

A head 55 is formed coextensive with the flange 54 and is illustrated with two intake passages 56 and 57. Sealing means is similar to that for the valve illustrated in Figs. 1, 2 and 3, there being an O-ring seal above and below for each intake passage and for the shaft, and another for the disc adjacent its periphery. The valve disc has a single passage 58 which is selectively registrable with the two intake passages for selective discharge from two sources, and for closing off both passages when the passage 58 is in its intermediate or neutral position. The housing is shown with a plurality of outlets 59 and 60 for simultaneous dispensing to two points.

The securing means for securing the head and base or housing together consists of integral C-clamps, the clamps 61 being formed integral with and projecting from the head, while the clamps 62 are integral with the base or flange of the housing and overhang the perimeter of the head. These clamps are provided with thumb or wing screws 63. Merely loosening these screws permits relative lateral movement between the head and the base for disassembly after which the valve disc with its shaft and hand lever can be withdrawn, completing disassembly.

I claim:

1. A sanitary valve, in combination, a head, a base including a depending discharge housing having a shaft bearing depending therethrough, an intake passage formed through said head, and a discharge passage formed through said base in axial registry with said intake passage and discharging into said dependent discharge housing, said dependent discharge housing having a plurality of dispensing outlets, a valve disc rotatably seated in a circular recess formed in the top of said base with said head cooperative with the top surface of the disc, opposed semicircular clamping means respectively integral with said head and said base and respectively cooperative with the remaining semi-circular portion of each the base and the head for releasably securing said head and said base together through sliding movement of one on the other for rapid assembly and disassembly to expedite cleaning and sterilization, and a valve shaft cooperative with said valve disc and having a handle at its lower end for manual rotative operation of said disc for opening and closing said intake and discharge passages.

2. A combination as defined in claim 1, said handle having a maximum diameter slightly less than that of said valve shaft and being hingedly connected to the lower end of said valve shaft for withdrawal of said shaft with connected handle through said bearing to expedite disassembly.

3. A combination as defined in claim 1, sealing means comprising a first restricted groove formed in said base adjacent to the periphery of said valve disc, a second restricted groove formed in said head and surrounding said intake passage, and a third restricted groove formed in said base and surrounding said discharge passage, said grooves having each a semicylindrical bottom and convergent side walls, and an O-ring in each of said grooves and having a cross-sectional area slightly greater than the cross-sectional area of the groove and inserted under compression and thereby being caused to bulge above the surface of the base and below the surface of the head, each of said grooves having a finger access recess at one point for convenient removal and replacement of the O-ring, and a plug and securing means therefor for each recess and conforming to the adjacent side of the groove and the recess.

4. A valve comprising a head having a plurality of spaced intake passages opening perpendicularly therethrough, a base having a depending discharge housing having a plurality of dispensing passages, and a shaft bearing depending through the said discharge housing, said base having a plurality of discharge passages in axial registry with said intake passages and being in communication with said dispensing passages through said discharge housing, a valve disc rotatable between said head and said base and having a passage formed therethrough and selectively axially registrable with the respective intake passages and having an axially dependent shaft rotatable in and axially retractable through said bearing, said head and said base each having a half-circumferential securing means with the respective securing means operating in opposition through sliding movement of the head and base on each other, and a handle hinged at the lower end of said shaft for manual operation of the valve disc.

5. A structure as defined in claim 4, sealing means comprising a groove formed in angular relation to the perpendicular and inclined toward the axis of, and surrounding each passage, with the bottom of the groove substantially semi-circular in cross section and with side walls converging to a relatively narrow opening, and an O-ring seated in the groove and being of larger cross-sectional area than the groove for compression in the groove and protrusion therefrom for cooperation with the valve disc.

6. A structure as defined in claim 5, a finger recess formed radially into the side of each groove for access for removal and replacement of the O-ring, and a plug fitting in said recess and having the intervening portion of the groove formed in the terminal end for completion of the groove for uniform compression throughout the circumferential length of the O-ring, and means for releasably securing said plug in said recess.

7. A valve comprising a head and a base having plane contacting cooperative faces and circumferential rims, an intake passage formed through said head and a connection for said intake passage, a discharge passage provided through said base in axial registry with said intake passage, a valve disc rotatably mounted between said head and said base and having a passage formed therethrough for axial registry with said intake and discharge passages, said head having a depending flange extending substantially throughout one-half of the circumferential rim and having a groove formed annularly in the inner surface, said groove having a top surface coplanar with the undersurface of the head and an inclined lower surface, said base having an upstanding flange extending throughout substantially one-half of its circumferential rim and having an internal annular groove having a bottom surface coplanar with the top surface of the base and an inclined top surface, the remaining portions of the circumferential rims of said head and said base being complementarily formed to the respective grooves for wedging cooperation therebetween, a laterally projecting ear provided at each terminal end of each flange, and releasable securing means cooperative between the adjacent ears on the respective sides of the head and base, whereby the head and base are assemblable and disassemblable through sliding movement therebetween and brought into absolute contact through the wedging cooperation between the respective grooves and remaining portions of the circumferential rims through operation of said releasable securing means, providing for quick assembly and disassembly for cleaning and sterilization.

References Cited in the file of this patent

UNITED STATES PATENTS

| | | |
|---|---|---|
| Re. 8,332 | Body | July 16, 1878 |
| 216,104 | Pitt | June 3, 1879 |
| 1,014,070 | Laxton | Jan. 9, 1912 |
| 1,495,870 | O'Donnell et al. | May 27, 1924 |
| 1,607,827 | Herrmann | Nov. 23, 1926 |
| 2,387,397 | Hill | Oct. 23, 1945 |

FOREIGN PATENTS

| | | |
|---|---|---|
| 71,640 | Norway | Feb. 3, 1947 |